United States Patent [19]
Williams

[11] Patent Number: 5,854,595
[45] Date of Patent: Dec. 29, 1998

[54] COMMUNICATIONS APPARATUS AND METHOD WITH A COMPUTER INTERCHANGEABLE INTEGRATED CIRCUIT CARD

[75] Inventor: Tim A. Williams, Danville, Calif.

[73] Assignee: Wireless Access, Santa Clara, Calif.

[21] Appl. No.: 504,407

[22] Filed: Jul. 20, 1995

[51] Int. Cl.$^6$ .................................................. H04Q 7/14
[52] U.S. Cl. .............. 340/825.44; 340/825.47; 340/311.1; 361/686; 361/737; 235/380; 455/575; 455/38.1; 370/313
[58] Field of Search .................... 340/825.44, 825.07, 340/825.22, 875.34, 825.47, 311.1, 825.72, 825.69; 375/222; 455/186.1, 575, 38.1; 361/686, 737; 364/708.1; 235/375, 380; 370/310, 313

[56] References Cited

U.S. PATENT DOCUMENTS

| | | | |
|---|---|---|---|
| 5,361,061 | 11/1994 | Mays et al. ........................ | 340/825.44 |
| 5,423,086 | 6/1995 | Cannon et al. ....................... | 455/186.1 |
| 5,444,869 | 8/1995 | Stricklin et al. ............... | 340/825.44 X |
| 5,512,886 | 4/1996 | Macko et al. .................. | 340/825.44 X |
| 5,550,861 | 8/1996 | Chan et al. ..................... | 340/825.44 X |
| 5,559,501 | 9/1996 | Barzegar et al. ............... | 340/825.44 X |
| 5,619,396 | 4/1997 | Gee et al. ......................... | 364/708.1 X |

*Primary Examiner*—Michael Horabik
*Assistant Examiner*—William H. Wilson, Jr.
*Attorney, Agent, or Firm*—Blakely, Sokoloff Taylor & Zafman LLP

[57] ABSTRACT

A communication portable radio frequency (RF) communication device such as a pager that receives messages and formats selected messages and stores the formatted messages on a removably attached integrated circuit card (IC) computer card. After receiving and formatting messages, the card may be removed and coupled to a computer system. Then the computer system may access the data on the card.

34 Claims, 5 Drawing Sheets

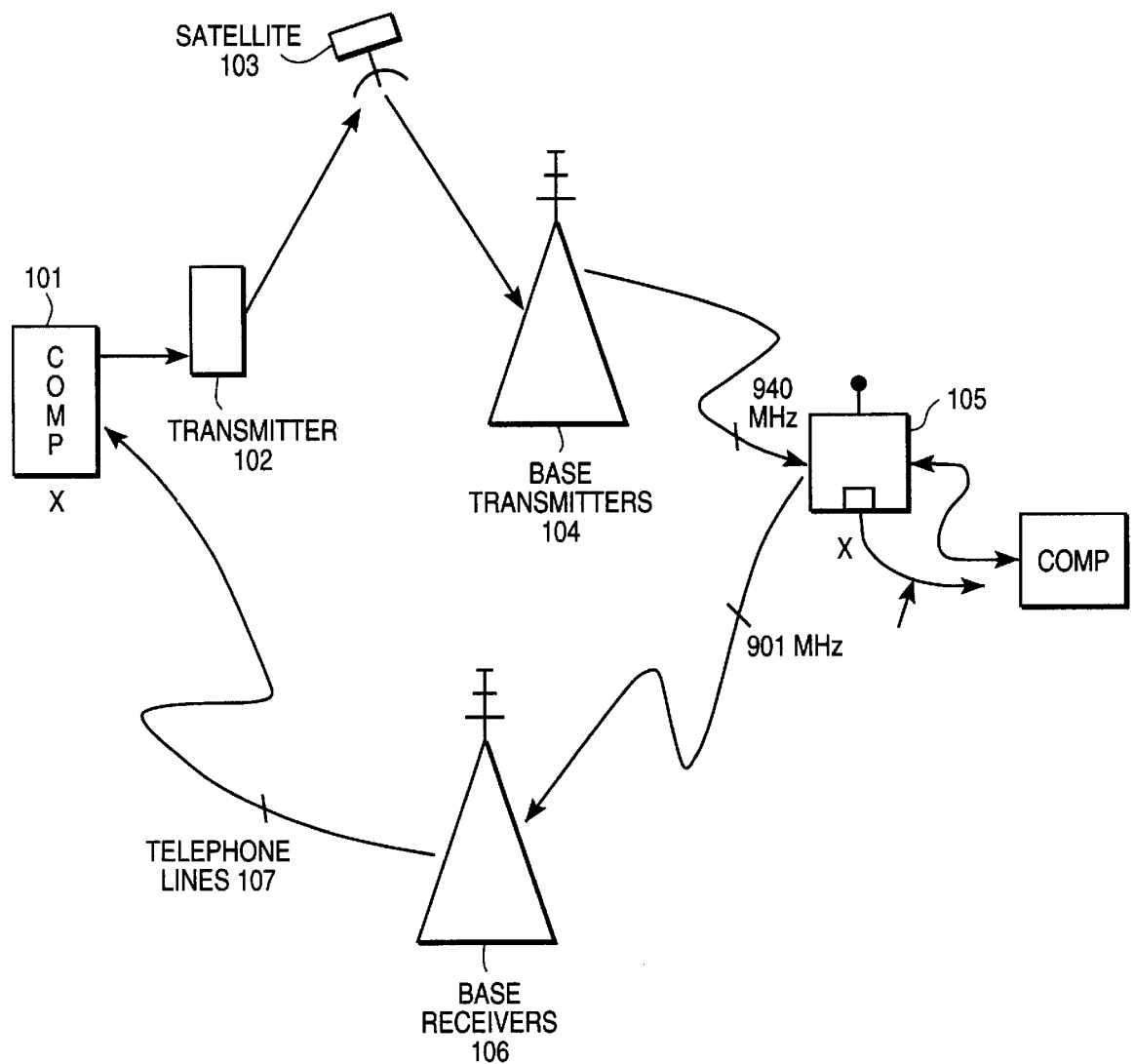
FIG_1 (PRIOR ART)

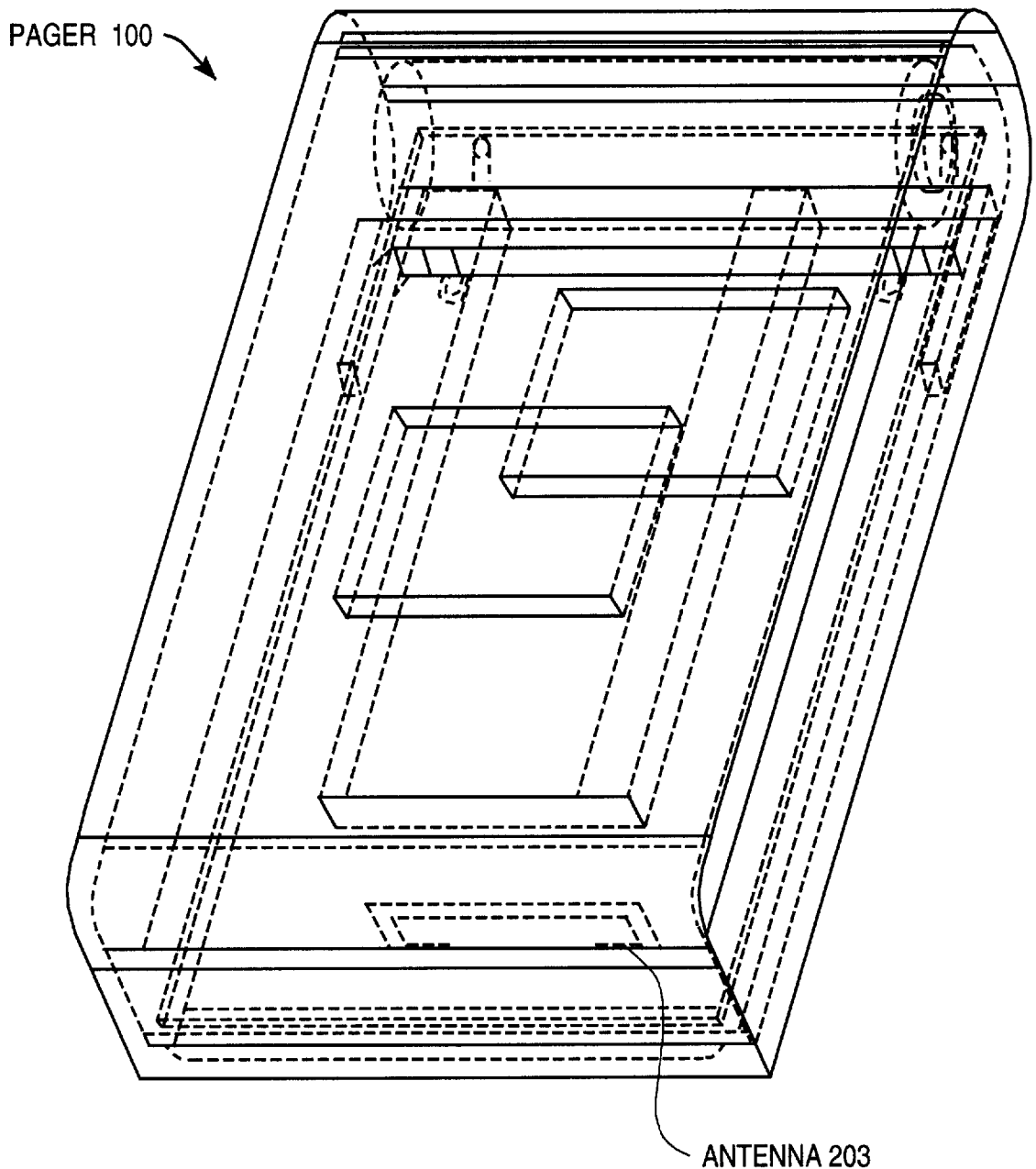
FIG_2A

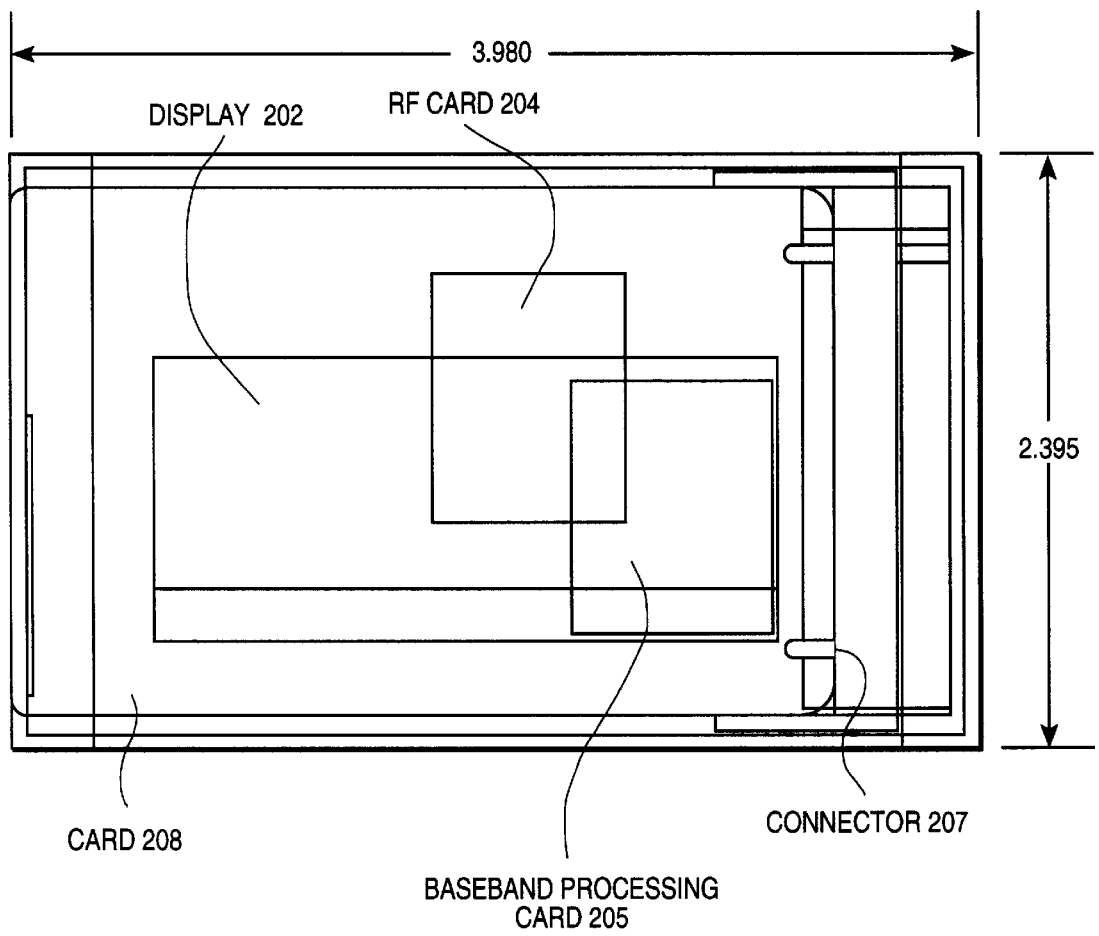
FIG_2B

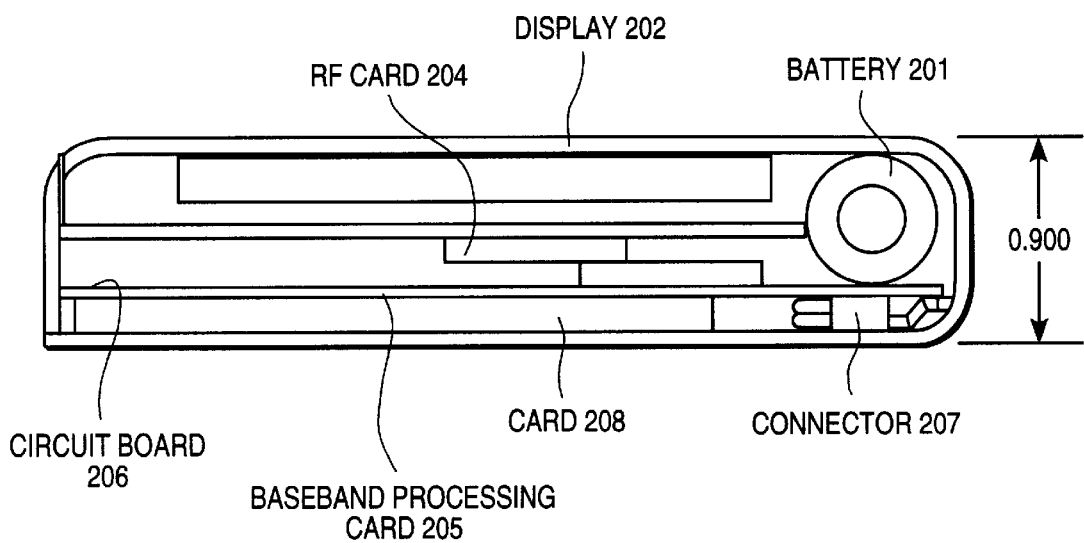
FIG_2C

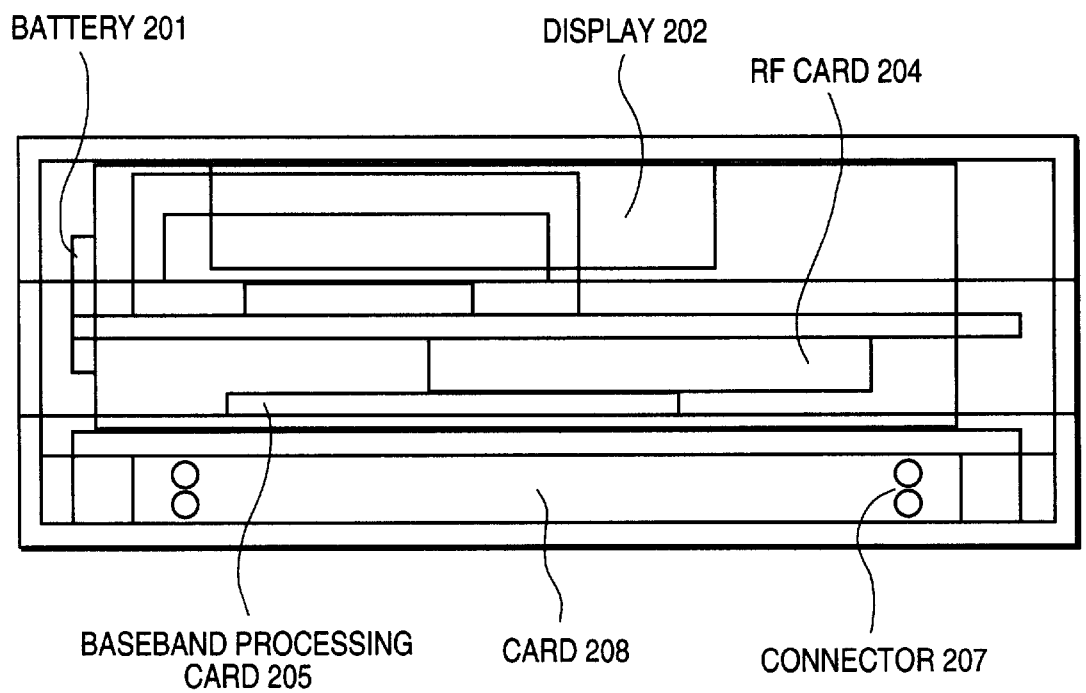
FIG_2D

COMMUNICATIONS APPARATUS AND METHOD WITH A COMPUTER INTERCHANGEABLE INTEGRATED CIRCUIT CARD

FIELD OF THE INVENTION

This invention relates to the field of communication devices; more particularly, the present invention relates to paging devices that include credit-card sized removably integrated circuit cards.

BACKGROUND OF THE INVENTION

Today, paging receivers come in many different sizes and shapes. For example, some paging devices are belt-top paging devices, while others are designed to be inserted into computer systems, such as in the case of PCMCIA wireless paging devices.

One problem with PCMCIA wireless paging devices is that the computer system does not always provide power to the PCMCIA slot. Therefore, the PCMCIA wireless paging device must be self-powered. Furthermore, the PCMCIA cards must be under five millimeters in height to fit into the Type II format of the PCMCIA standard. Because of the size requirements, expensive specially-designed components must be used in each of the devices.

Another problem with PCMCIA card paging receivers is that they are susceptible to the radio waves being emitted by the computer system (when connected to the computer system). These radio waves originate typically from the processor(s), memories, bus, and other components within the computer system. Radio waves at higher frequencies generally do not interfere with PCMCIA card paging devices; however, the FCC allows radiation of lower frequencies that do cause interference. Some prior art pagers are able to communicate directly with a computer system using a serial cable. In such a system, the pager uses an RS-232 connection scheme. The computer system uses special command controls and uses a program that formats and manipulates the information that is received from the serial cable. The formatting is required because the information on the pager cannot go directly into an application file folder.

The present invention provides a communication device that uses a card, such as a PCMCIA card, and may obtain information, store it on the card. The card may then be used with a computer system such that the information does not require formatting by the computer system.

SUMMARY OF THE INVENTION

An apparatus and method for communicating are described. The present invention comprises a radio-frequency (RE) messaging mechanism that includes a connector and a removably attached integrated circuit (IC) card. In one embodiment, the RF messaging mechanism comprises a paging mechanism, while the IC card comprises a computer compatible card, such as a PCMCIA card.

BRIEF DESCRIPTION OF THE DRAWINGS

The present invention will be understood more fully from the detailed description given below and from the accompanying drawings of the various embodiments of the invention, which, however, should not be taken to limit the invention to the specific embodiments, but are for explanation and understanding only.

FIG. 1 illustrates one embodiment of a two-way paging system.

FIGS. 2A–D illustrate one embodiment of the communication device of the present invention.

DETAILED DESCRIPTION OF THE PRESENT INVENTION

A communication device having a removable computer system compatible card is described. In the following detailed description of the present invention numerous specific details are set forth, such as specific dimensions, card types, application program types, etc., in order to provide a thorough understanding of the present invention. However, it will be apparent to one skilled in the art that the present invention may be practiced without these specific details. In other instances, well-known structures and devices are shown in block diagram form, rather than in detail, so as not to obscure the present invention.

The present invention provides a communication device that enables a user to receive and process messages. In one embodiment, the communication device comprises a paging receiver that receives messages via a paging channel. The communication device of the present invention comprises processing capabilities to process certain received messages. The communication device processes the information in these messages so that the information may be used and may be made easily accessible by a computer system. The communication device of the present invention also includes a removable computer card, such as a credit-card sized integrated circuit card (e.g., PCMCIA card). The card may be used to transfer processed information to a computer system from the communication device and vice versa. In one embodiment, the present invention comprises a pager that has the capability to accept messages and communicate with a PCMCIA memory card or other computer system compatible card.

The communication device of the present invention may be designed for use in a one-way paging system or in a two-way paging system. In a one-way paging system, a computer, server, or other control device is interfaced to a transmitter in the paging system and initiates transmission of paging messages. The transmitter, via links to a satellite and one or more base transceivers, sends these paging messages to pagers.

In a two-way paging system, such as is shown in FIG. 1, the same components comprise the same communication path to the pager. That is, a computer or other control device 101 interfaces with a paging transmitter 102 (via, for instance, the Internet or some other network), transmitter 102 sends paging messages using satellite 103, and in turn, satellite 103 transmits the paging messages to base transmitter 104 for forwarding onto pager 105. In one embodiment, the communication between base transmitter 104 and pager 105 occurs at 940 MHz. Pager 105 includes transmitter functionality that allows for transmitting messages over air waves at 901 MHz to base receiver 106. Such functionality is well-known in the art. Base receiver 106 uses telephone lines to transmit the messages to the control device 101.

One Embodiment of the Communication Device of the Present Invention

FIGS. 2A–D illustrate one embodiment of the communication device of the present invention. FIG. 2A is a perspective view of a pager 100, while FIGS. 2B–D illustrate side views of pager 200. Pager 200 of the present invention comprises a battery 201, a pager receiver that includes a display 202, an antenna 203, an RF card 204 and baseband processing card 205 attached to a circuit board 206, and a card connector 207. Pager 200 also includes an integrated circuit card 208. These components operate in a manner well-known in the art except where set forth below in the teachings of the present invention.

RF card 204 and baseband processing card 205 in cooperation with antenna 203 and display 202 function as a paging receiver. Antenna 203 may comprise a loop antenna. In one embodiment, these components operate together to function as a one-way paging receiver. In an alternate embodiment, these components operate together to function as a two-way paging receiver.

Battery 201 supplies power to circuit board 205, RF card 204, baseband processing card 205, antenna 203 and display 202. In one embodiment, battery 201 comprises a AAA battery.

Connector 207 interfaces card 208 to components in the paging receiver portion of pager 200. In one embodiment, card 208 comprises a memory card. Card 208 may comprise a card that adheres to the PCMCIA standard, such as a Type II PCMCIA card. In such a case, connector 207 comprises a standard 68 pin PCMCIA connector. The present invention is not limited to using PCMCIA cards and may use any removably coupled cards as long as a compatible connection mechanism (e.g., a connector) is included in pager 200.

Although not shown, pager 200 may include a clip or other connector mechanism to enable it to be attached to a belt or other tangible item to facilitate its portability. These types of mechanisms are well-known in the art.

In one embodiment, pager 200 has a length of 3.98 inches, a width of 2.395 inches and a height of 0.9 inches.

Pager 200 of the present invention receives two types of messages. One type of message is a typical paging message. Upon receipt of the typical paging message, the user may view the message on display 202 in a manner well-known in the art. The other type of message is a data or information message. Although the data message is received via a paging receiver, it generally includes information which is not meant to be viewed and interpreted by simply examining the message on display 202. That is, these messages include information for use with application programs running on computer or other data processing systems.

In one embodiment, the user of pager 200 is able to determine the type of message received by examining display 202. Display 202 notifies the user that a message has been received. By displaying different addresses on display 202, the user is able to determine whether the message is a typical paging message that is designated for display or a data message not designated for display. In one embodiment, the data messages do not appear on the screen at all.

Processing logic in pager 200 may automatically identify received messages that are to be formatted. Such identification may be based on header information or bit pattern identification. Those messages identified are formatted, while those not identified are considered typical paging messages. In this manner, the present invention provides for selective formatting and manipulation.

Pager 200 of the present invention includes processing capabilities which enable selective formatting and manipulating information of received data messages. The data processing capabilities of the present invention are included on circuit board 205 in broadband processing card 204 and allow the information in messages to be manipulated for use by a computer system. In other words, the information is processed by pager 200 into a format that the computer system readily recognizes and with which it may interact without additional conversion.

Thus, the communication device of the present invention receives normal paging messages, which are generally short, that can be read via a paging display. The communication device of the present invention also receives data messages, which are generally longer than the paging messages, that may be manipulated on the communication device for use by a unit other than the communication device, such as a personal computer.

In one embodiment, the present invention uses addresses to distinguish between typical paging messages designated for review by the user using the paging receiver and data messages that include information to be manipulated. While the paging messages are sent to display 202, the information corresponding to preselected addresses is sent to the card 208 (e.g., memory card) for storage therein. In an alternate embodiment, the paging device may be configured to send all messages to the display. Thus, the present invention provides for selective displaying of messages.

In one embodiment, pager 200 uses software to format the incoming data into the proper file structure. Such software processing is well-known in the art. Initially, the messages are received and stored on card 108 prior to any formatting being performed. In this manner, card 108 acts as a temporary storage buffer and work area.

Once received, the format processing identifies the type of data and formats the data according to its type. In one embodiment, pager 200 formats the data according to the application program or operating system for which the information is intended to be used. That is, pager 200 processes the data into the proper format to be recognized by the application program that is to access the data (e.g., converts it into the proper file format). For instance, pager 200 formats the data for application programs such as Excel, Filemaker Pro, etc. The pager 200 may format data based on a specified application program, operating system or both.

In one embodiment, pager 200 identifies the application program for which the data is intended from information (e.g., addresses) in the header of the message itself. Based on the information (e.g., addresses) in the header, the format processing of the present invention formats the data. For instance, pager 200 examines the address in the header of the paging message and, based on an address, determines the application program to which the data in the message should be formatted.

Once the formatting has been completed, the card may be removed from the pager and inserted into a computer system. If the card is a standard computer card (e.g., a PCMCIA card), then the computer system need only include a standard connector to receive the card and well-known interface capabilities to interact with the card. Card 208 may comprise any commercially available type of card.

When inserted into the computer system, an application program running on the computer system may access data on card 208 without converting the data or performing any special manipulation of the data in which it resides. That is, the application program may be run and access any of the files that the paging receiver has created on card 208 in the same manner as the computer system accessed data on IC cards in the prior art. In this manner, the present invention allows communicating information over RF channels, manipulating the data received and storing the data on an IC card, such that the data stored on the memory card is compatible with the programs on the computer system.

In one embodiment, the type of formatting performed by pager 200 is determined and set forth by the computer system. That is, the computer system specifies how the files are to be formatted. This specification is performed by the computer system configuring card 208 which when inserted into pager 200 controls the manner in which processing capabilities operate. The configuration file may specify the file formats and how the paging receiver portion manipulates the data into file folders and structures in memory on card 208. Thus, once card 208 is inserted in pager 200, the paging receiver formats and creates the hierarchy desired by the computer system.

In one embodiment involving two-way paging technology, the present invention allows messages to be transferred from the computer system to card 208 and then transmitted by pager 200 once card 208 has been inserted. Identification and processing of the messages to be transmitted is determined by file format and location on this IC card. Information stored on this IC is also used to configure and control the operation of the two-way pager. Pager 200 interprets the data on card 208 so as to put the data into a format suitable for transmission. Once formatting has been completed, the transceiver of pager 200 transmits the information.

The present invention provides numerous advantages over the prior art because an individual is able to receive data messages with the communication device of the present invention and need not carry a portable computer with them as required with PCMCIA card paging receivers.

One benefit of the present invention is that the memory cards are commercially available, in that any off-the-shelf IC card may be used. Furthermore, individuals desiring to frequently carry both their pager and their PCMCIA paging cards will be able to carry them in one single unit having the additional functionality described above.

Another benefit is that the cost of the paging receiver is less because the size of the components used in the paging receiver is not as small as would be required if the pager was the size of a PCMCIA paging card.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the various embodiment are not intended to limit the scope of the claims which in themselves recite only those features regarded as essential to the invention.

Thus, a communication device has been described.

I claim:

1. An apparatus comprising:
a portable radio-frequency (RF) messaging mechanism; and
an integrated circuit (IC) card having a connector and being removably coupled to the RF messaging mechanism and a computer system at different times using the connector, wherein said IC card stores messages received by the portable RF messaging mechanism and is computer compatible to permit access to information stored on the IC card when coupled to a computer via the connector, such that the connector supports coupling the IC card to the RF messaging mechanism and the computer system using the same interface at different times.

2. The apparatus defined in claim 1 wherein the RF messaging mechanism comprises a paging receiver.

3. The apparatus defined in claim 1 wherein the RF messaging mechanism comprises a paging transceiver.

4. The apparatus defined in claim 1 wherein the IC card is a computer system compatible card to allow access by a computer system to messages stored on the IC card when the IC card is coupled to the computer system and to permit information exchange between the RF messaging mechanism and the IC card when the IC card is coupled to the RF messaging mechanism.

5. The apparatus defined in claim 1 wherein the RF messaging mechanism further comprises means for formatting received data into data structures recognizable by the computer system.

6. The apparatus defined in claim 5 wherein the means for formatting formats data for a specified operating system.

7. The apparatus defined in claim 6 wherein the means for formatting formats data for a specified application program.

8. The apparatus defined in claim 1 wherein the RF messaging mechanism further comprises means for interpreting data structures on the IC card into transmitted data.

9. The apparatus defined in claim 8 where the means for interpreting interprets data for a specified operating system.

10. The apparatus defined in claim 1 wherein the RF messaging mechanism formats data received as one or more messages according to configuration information on the IC card.

11. The apparatus defined in claim 10 wherein the IC card stores configuration information that the RF messaging mechanism uses to configure itself.

12. The apparatus defined in claim 1 wherein the IC card comprises at least one memory.

13. The apparatus defined in claim 1 wherein the RF messaging mechanism interprets data contained on the IC card as control and formatting information for the RF messaging mechanism.

14. The apparatus defined in claim 1 wherein the IC card comprises a PCMCIA card.

15. A pager comprising:
a paging receiver to receive page messages and to format selected messages;
a computer system compatible card removably coupled to the paging receiver, via an interface on the card, to store the selected messages formatted by the paging receiver, said selected messages accessible by a computer system through the interface when the card is coupled to the computer system interface, such that the card communicates with the paging receiver and the computer system using the same interface at different times.

16. The pager defined in claim 15 further comprising a housing coupled to the paging receiver, said housing having an opening designed for insertion and removal of the card.

17. The pager defined in claim 15 wherein the pager has a connector and the card has a connector interface coupled to the connector to receive information to be stored on the card, and the card permits access to information stored therein via the connector interface by a computer system when the connector interface is coupled to the computer system.

18. The pager defined in claim 15 wherein the card comprises at least one memory.

19. The pager defined in claim 15 wherein the card comprises a PCMCIA card.

20. The pager defined in claim 15 wherein the card stores configuration information that the paging receiver uses to configure itself.

21. The pager defined in claim 15 further comprising a display to provide indications of messages being received and whether messages have been formatted.

22. A two-way pager comprising:
a paging transceiver to receive and transmit messages, wherein the paging transceiver formats selected messages and interprets selected messages;

a computer system compatible card removably coupled to the paging transceiver, via an interface on the card, to store the selected messages formatted by the paging receiver, and wherein information stored on the card is accessible by a computer system through the interface when the card is coupled to the computer system, such that the card communicates with the paging transceiver and the computer system using the same interface at different times.

23. The two-way pager defined in claim 22 further comprising a housing coupled to the paging transceiver, said housing having an opening designed for insertion and removal of the card.

24. The two-way pager defined in claim 22 wherein the card comprises at least one memory.

25. The two-way pager defined in claim 22 wherein the card comprises a PCMCIA card.

26. The two-way pager defined in claim 22 wherein the card stores configuration information that the paging transceiver uses to configure itself.

27. The two-way pager defined in claim 22 further comprising a display for selective display of messages being received.

28. The two-way pager defined in claim 22 wherein the paging transceiver stores selective messages in the IC card.

29. The two-way pager defined in claim 22 wherein the paging transceiver transmits data received after formatting.

30. A method of communicating information comprising the steps of:

receiving a paging message containing data using a paging receiver in a paging mechanism;

the paging mechanism formatting the data;

storing the formatted data onto a removably attached integrated circuit card coupled to the paging mechanism via an interface on the card;

uncoupling the card from the paging mechanism and coupling the card to a computer system; and the computer system accessing data from the paging mechanism on the card via the interface, such that the card communicates with the paging receiver and the computer system using the same interface at different times.

31. A method of communicating information comprising the steps of:

the computer system formatting and storing data on an integrated circuit (IC) card via an interface on the card;

removing the IC card from the computer and coupling the IC card to a paging mechanism;

the paging mechanism accessing the data from the IC card via the interface, such that the card communicates with the paging receiver and the computer system using the same interface at different times.

32. The method defined in claim 31 further comprising the step of the paging mechanism configuring itself based on data accessed from the IC card.

33. The method defined in claim 31 further comprising the step of the paging mechanism selectively manipulating transmitted messages received by the paging mechanism based on data accessed from the IC card.

34. The method defined in claim 31 further comprising the step of:

the paging mechanism accessing the data to format a transmitted message.

* * * * *